(No Model.)

W. W. DOOLITTLE.
MOLDING MACHINE.

No. 523,466. Patented July 24, 1894.

Witnesses

Inventor
William W. Doolittle
By Coburn & Thacher
Attys.

(No Model.) W. W. DOOLITTLE. 5 Sheets—Sheet 3.
MOLDING MACHINE.

No. 523,466. Patented July 24, 1894.

Witnesses
W. C. Coles
Jno. A. Christianson.

Inventor
William W. Doolittle
By Coburn & Thacher
Attys.

(No Model.) 5 Sheets—Sheet 5.

W. W. DOOLITTLE.
MOLDING MACHINE.

No. 523,466. Patented July 24, 1894.

Witnesses
W. C. Corliss
Jno. A. Christianson.

Inventor
William W Doolittle
By Coburn & Thacher
Attys

UNITED STATES PATENT OFFICE.

WILLIAM W. DOOLITTLE, OF CHICAGO, ILLINOIS, ASSIGNOR TO THE CRANE COMPANY, OF SAME PLACE.

MOLDING-MACHINE.

SPECIFICATION forming part of Letters Patent No. 523,466, dated July 24, 1894.

Application filed June 10, 1893. Serial No. 477,195. (No model.)

*To all whom it may concern:*

Be it known that I, WILLIAM W. DOOLITTLE, a citizen of the United States, residing at Chicago, in the county of Cook and State of Illinois, have invented certain new and useful Improvements in Molding-Machines and Process, which are fully set forth in the following specification, reference being had to the accompanying drawings, in which—

Figure 1:
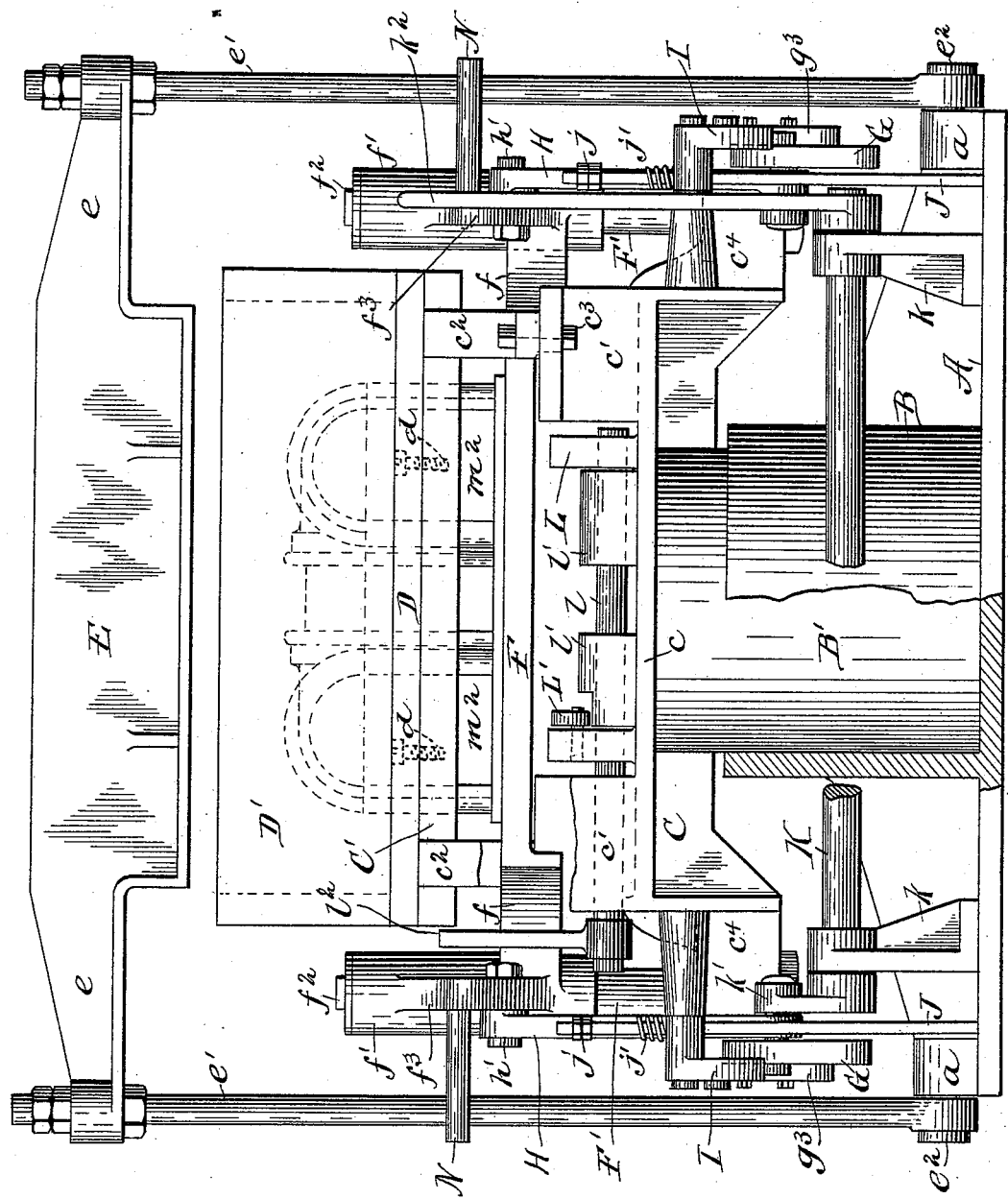
Figure 2:
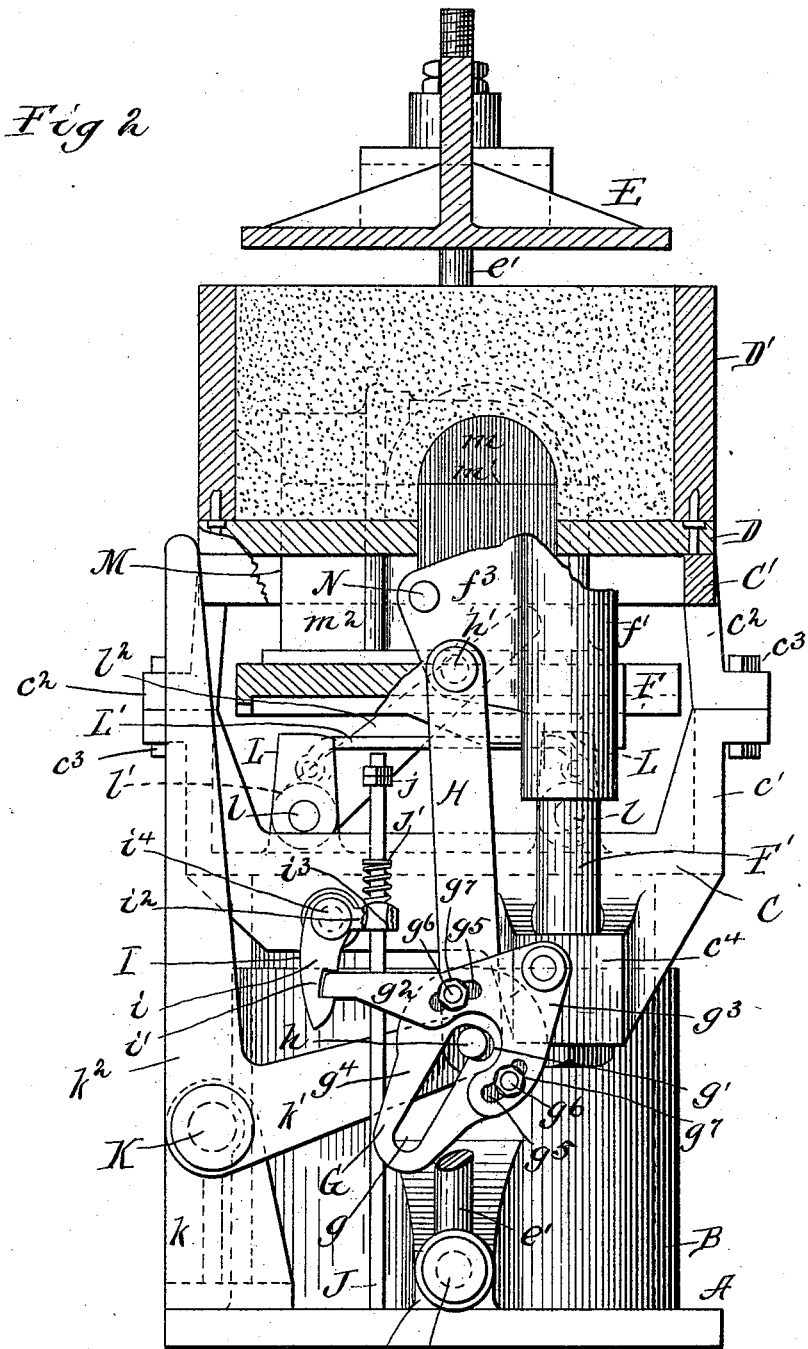
Figure 3:
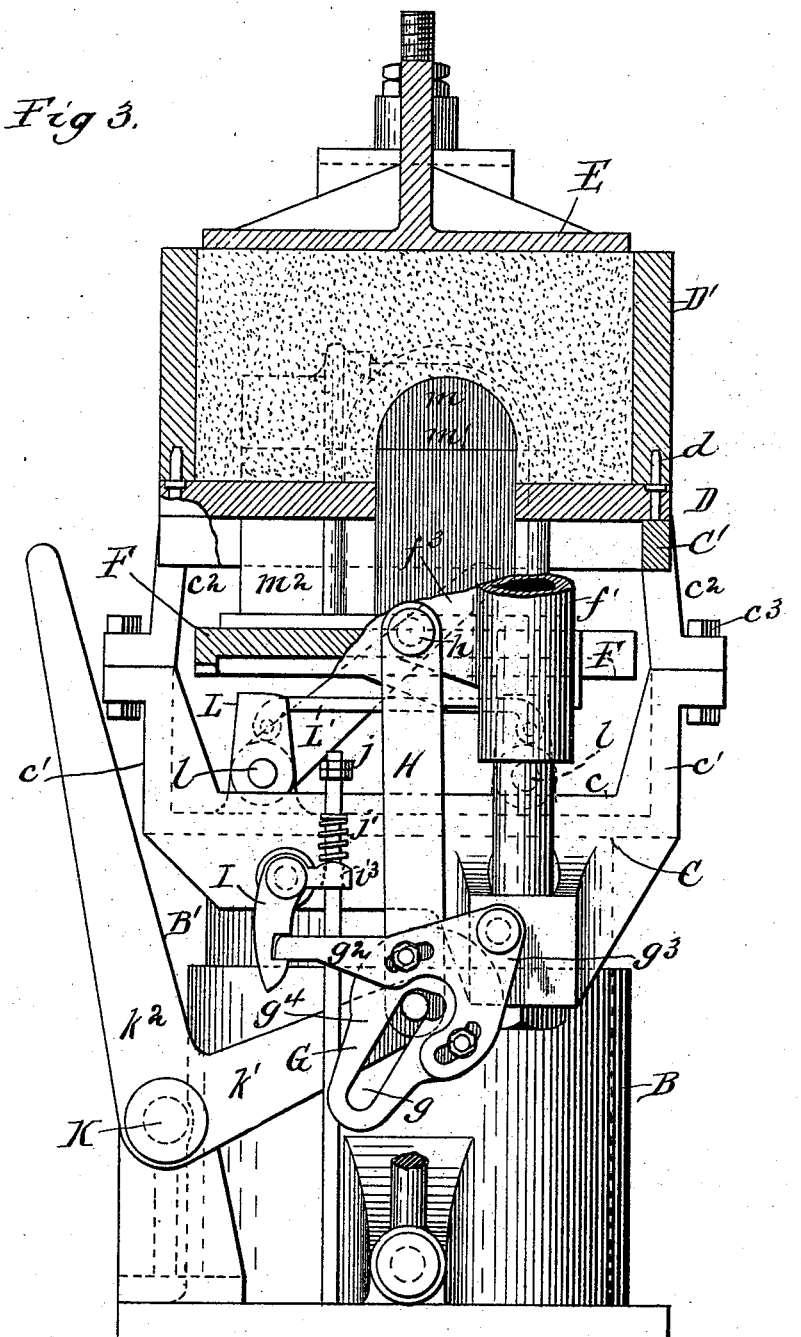
Figure 4:
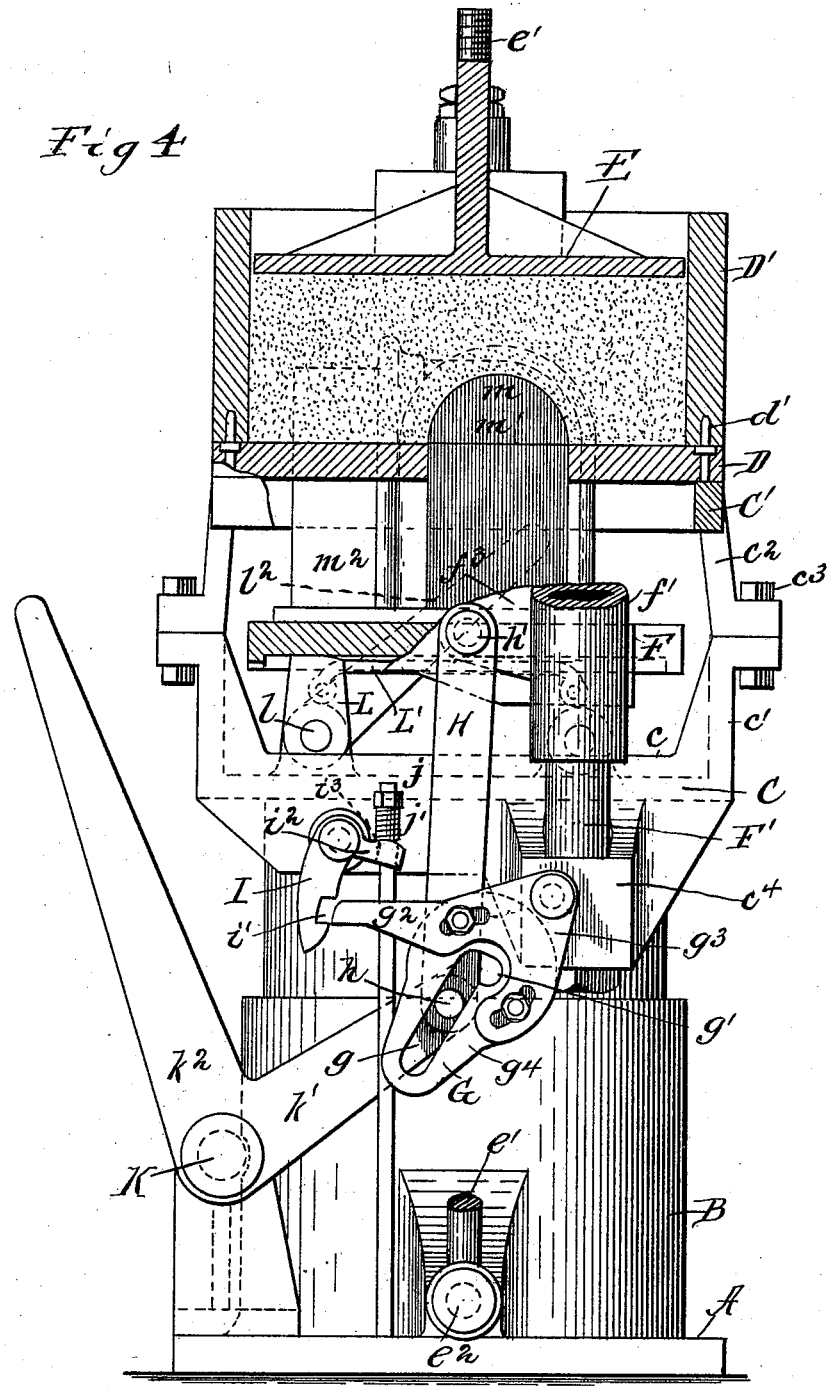

Figure 1 represents a front elevation of a molding machine embodying my invention; Fig. 2, an end elevation partly in section of the same taken at the right of the machine and showing the devices in position ready to lift the mold; Fig. 3, a similar view with the devices in position after elevating the mold to the platen; Fig. 4, a similar view showing the devices in position after elevating the mold still farther to bring the required pressure of the platen thereon; and Fig. 5, a similar view showing the mechanism in collapsed position after the mold has been completed and the flask in readiness to be removed.

In the drawings, Fig. 1 is upon a scale by itself; all the remaining figures are upon one and the same scale but enlarged from that of Fig. 1.

My invention relates to a machine for making sand molds for use in casting articles from metals. In the preparation of such molds patterns of the castings are, of course, employed, and, in forming the molds by machinery, difficulty has been found in producing a mold in which the sand is uniformly compacted; in fact, many attempts to make molds by machinery have been unsuccessful because of lack of uniform compactness in the molds produced.

The object of my invention is to obviate this objection by producing a machine in which the sand is uniformly compacted throughout the mold, notwithstanding the presence of the patterns. This result is accomplished by providing a movable mold support having the usual stripping plate, a separate movable pattern support, and mechanism whereby a differential movement is given to the two supports as they are forced against the compressing platen. This general feature of construction is the subject matter of my present invention, and in addition thereto, one form of mechanism whereby the general invention may be carried out. In a prior application, Serial No. 447,656, filed October 3, 1892, I have shown and described a machine in which this broad invention is carried out in one way, but have not claimed the broad invention indicated above in the said application and have only sought to secure claims covering the type of machine therein set forth. In the present case I lay no claim to the particular construction of machine shown in the said prior application, but do make a generic claim to the broad invention designated above, of which the improvement set forth in my said prior application is one species, and the machine described and shown in the present application is another species, which will also be claimed as such herein.

I will now describe in detail the construction and operation of the particular machine here shown in the drawings, in which my general invention is carried out in one practical way, and will then set forth in claims the generic and specific improvements which I believe to be new and wish to secure by Letters Patent.

In the drawings, A represents the base and stationary portion of the machine, on which is located the device for actuating a movable mold support. This actuating device may be adapted to be operated by fluid pressure or by any other force suitable for the purpose.

In the drawings I have shown a cylinder, B, stationary on the base and fitted with a piston, B', movable in the cylinder. Obviously this device is adapted for operation by any fluid pressure which, admitted to the bottom of the cylinder, will raise the piston therein. The mold support, C, is, in this instance, shown secured to the upper end of the piston, whereby it is evident that the movement of the latter within the cylinder will impart a corresponding movement to this mold support, as the latter as here shown is mounted wholly on the piston and supported and controlled thereby. This particular device for giving movement to the mold support is not, however, a necessary part of the invention; the device described and shown in my said prior application for this purpose may be employed instead, or in fact, any device which is adapted to actuate the mold support so as to move it up toward the platen and withdraw it therefrom, as required for molding with a stationary platen. The main portion of this mold support is a kind of rectangular bed, $c$, from the four corners of which rise short posts, $c'$.

A rectangular frame, $C'$, is provided at its four corners with depending legs or projections, $c^2$, which are adapted to rest upon the upper ends of the posts, $c'$, to which they are secured by bolts, $c^3$, as seen in Fig. 2.

The stripping plate, D, is applied to and supported by this rectangular frame, $C'$, the latter in connection with the bed piece, $c$, to which it is rigidly connected, constituting a rigid support for the stripping plate, D, on which the flask, $D'$, is mounted as usual.

The stripping plate may be secured on the frame, $C'$, by means of bolts, $d$, or any other device which will permit the stripping plate to be removed if desired. This stripping plate is also provided with dowel-pins, $d'$, which serve to fix the flask in place on the plate, as seen in the drawings.

The main movement is, of course, the same in this machine as the usual one in other molding machines; that is, the flask containing the patterns and filled with sand is forced against the stationary platen, by means of which the sand is compressed in the flask. This platen, E, as shown in the drawings, is provided with arms, $e$, by means of which it is secured to the upper ends of two long rods, $e'$, arranged at each end of the machine and at their lower ends mounted by pivotal bearings, $e^2$, on the bed of the machine, lugs, $a$, at the respective ends of the latter providing for this attachment.

Figure 5:
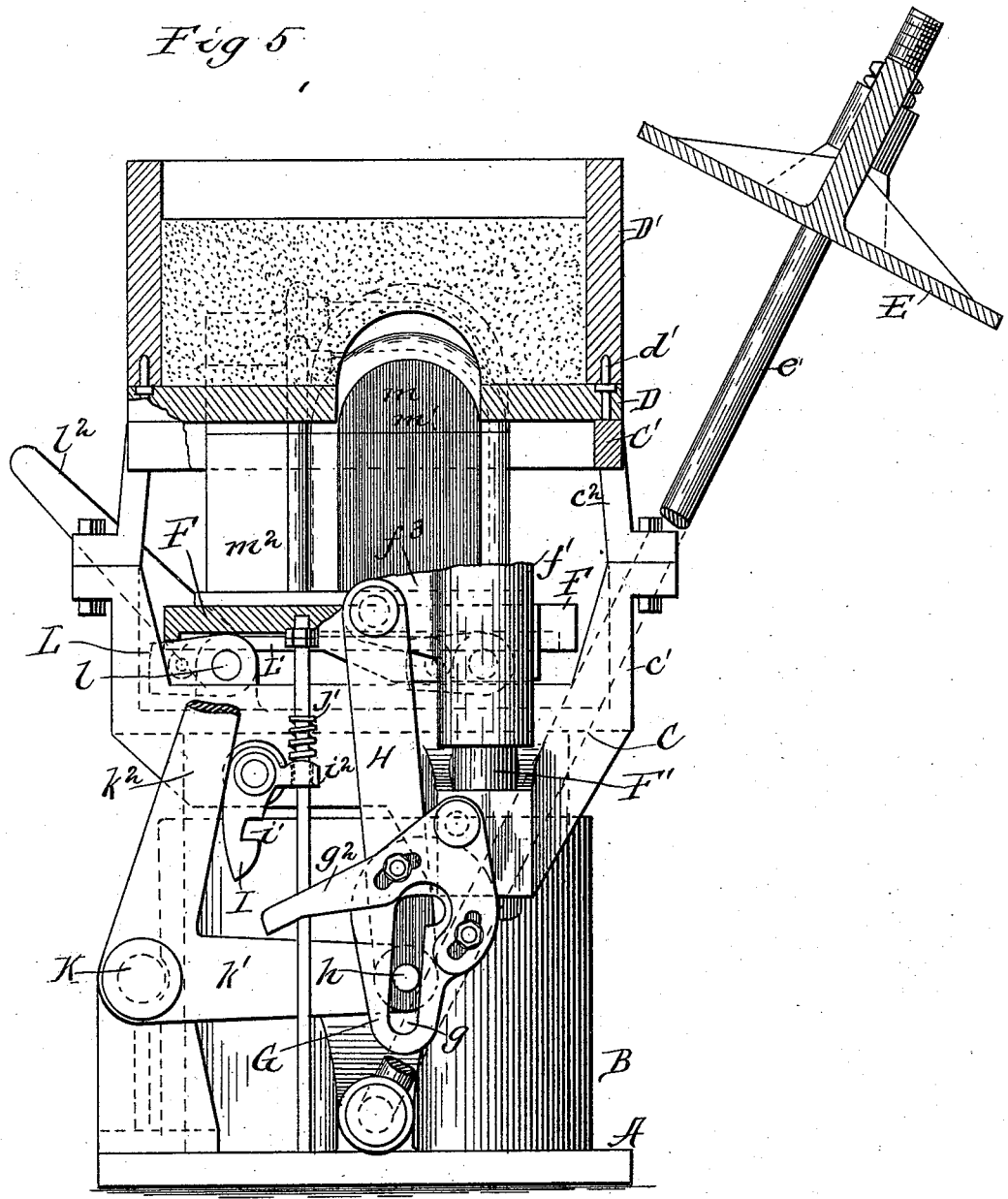

It will be seen from this description that the platen and its supports form a kind of yoke which may be swung laterally of the machine so as to bring the platen in position centrally over the flask on the mold support, as seen in Figs. 1 and 2 of the drawings, or turned back away from the same by the swinging of the arms on their pivots, as seen in Fig. 5. However, this construction and arrangement of the platen device are given for illustration only, and any other suitable devices for this purpose may be employed. But it will be understood, from the general statement of the object and operation of my invention given above, that in the general movement of the main support toward the platen, which, of course, must carry with it not only the flask and stripping plate but also the patterns and pattern support, the latter of these must have an independent movement differential from the general movement of the main support and the parts which it carries. The construction and operation of the mechanism by which this differential movement is effected in the present instance will now be described.

The pattern support and independent table, F, is arranged in the space between the bed, $c$, of the mold support and the stripping plate, as seen in the drawings. This table is mounted on the main or mold support in such a way that it may be carried thereby in the general movement toward the platen, and may also have an individual movement independent of the general one.

The table is substantially rectangular in form corresponding to the general conformation of the bed $c$, and the flask, and at each end it is provided with a projecting arm, $f$, extending outward horizontally and curving backward at each end of the machine, as seen in Fig. 1. Each of these arms carries upon its extremity a short tube or sleeve, $f'$, open at its lower end and preferably closed at the top by a suitable cap, $f^2$. These tubes or sleeves are at right angles to the pattern table, and, therefore, are in an upright position with reference to the machine and on their front sides are provided with a forwardly projecting flange, $f^3$. All these parts may be cast in one piece with the pattern table, and this is the construction shown in the drawings.

The bed, $c$, of the main support or mold support has at each end a short heavy lug or projection, $c^4$, arranged near the back of the bed and extending outward and downward at each end thereof, as seen in Figs. 1 and 2. Posts, $F'$, are mounted in these lugs in an upright position, and the arrangement of the parts is such that these posts stand in a position to receive the respective sleeves on the pattern table which are slipped down over the posts, as seen in the drawings. This connection fixes the position of the pattern table and holds it steady therein, but, at the same time, permits an independent vertical movement of the said table, as the sleeves are free to slide on the posts.

Provision is made for an independent backward movement of the pattern table as pressure is brought upon the mold by the movement of the mold support up toward the platen, the same as in my said prior application. This movement of the table is controlled by the following mechanism: At each end of the machine there is a kind of slotted cam, G, which is secured to the bed of the mold support at any convenient point. In the drawings this support is a pivot on the end lugs in which the upright posts, $F'$, are mounted. This cam may be made in one piece if desired, and is provided with a slot, $g$, commencing about the middle of the plate and extending straight outward toward the free outer end thereof. At its inner end the slot is enlarged or extended outward at one side so as to provide a shallow bend or recess, $g'$, which is about at right angles with the main slot, as seen in Fig. 2 and following. At the inner edge of this plate, opposite to the cross extension of the slot, there is an arm or toe piece, $g^2$, extending out some distance beyond the edge of the plate and in about a horizontal position. Thus far I have described this cam plate as made in one piece, but I prefer to construct it in two separate pieces suitably fastened together, for thereby I am enabled to make provision for a nice adjustment which is desirable for the purpose of securing precision in the operation of the devices. Preferably, therefore, this plate is composed of two pieces, $g^3$—$g^4$, the first of which is pivoted to the mold support while the slot, $g$, is in the latter. The arm, $g^2$, is also on the pivot piece, $g^3$. One of these parts is provided with elongated slots, $g^5$, and the other with pins, $g^6$; and the two are secured together by passing these pins through the said slots and turning the nuts, $g^7$, on their projecting ends. In the drawings the slots are shown in the pivoted piece, and the pins on the slot piece, but this is simply a matter of convenience and may be reversed if desired.

A connecting rod or bar, H, at each end of the machine is hinged at one end to the respective side flanges on the sleeves, while the lower ends of these arms are provided with pins, $h$, which enter respectively the slots, $g$, in the cam plates. The pivot pins, $h'$, by which these arms are connected to the sleeves, are seen in Fig. 1 of the drawings. A right angled, or bell crank dog or catch, I, is pivoted to the mold support bed at each end thereof; one arm, $i$, of this catch depends from the pivot and is provided at its inner edge with a notch, $i'$, and this arm is arranged to drop just in front of the projecting arm or toe piece, $g^2$, so that the latter may engage with this notch in the front, as seen in Figs. 2 and 3. The other arm, $i^2$, of the catch extends inward horizontally and is provided with an elongated slot, $i^3$; each catch is secured to the mold support bed by a pivot pin, $i^4$.

A small, stiff rod, J, is secured to each end of the base, A, and thence is extended upward through the slotted arms of the catch to a point a little above the bed, $c$, when the latter is in its normal position of rest or lowest point of adjustment, as seen in Fig. 2. Nuts, $j$, or other suitable stops are applied to the upper ends of these upright rods, which serve as guides and controlling rods for the catches, and spring coils, $j'$, are applied to the rods between the said stops and the arms of the catches through which these guide rods pass. These springs, however, occupy only a part of the space between the said two points of limitation when the mold support is in its normal position of rest, as seen in Fig. 2, and are free to slide up and down on the respective rods.

At the front of the machine and near the bottom thereof there is a rock-shaft, K, mounted in short standards, $k$, on the base, A. This shaft at each end has fixed arms or levers, $k'$, which are hinged at their outer ends to the lower ends of the respective connecting bars, H, so that the rocking of this shaft will lift or depress the pattern table according to the direction in which the shaft is moved. A lever, $k^2$, is fastened to the said shaft through which it may be rocked by an attendant, and, as shown in the drawings, the arm, $k'$, at this end of the shaft is made in one piece with this hand lever, though this is for convenience and the two may be separate if desired. The bed of the mold support is also provided with movable stops, L, arranged underneath the pattern table, the same as in my said prior application, and for the purpose of arresting the independent downward movement of the pattern table at a certain fixed point, which leaves the patterns in the exact position required in the molds. These stops, L, are short arms or posts fastened on rock shafts, $l$, which are mounted in suitable lug bearings, $l'$, on the said bed. The rock shafts are parallel, and one pair of stops, composed of one on each shaft, is connected by means of a link rod, L', hinged to the respective stops. A hand lever, $l^2$, is secured to the outer end of one of these rock shafts at one end of the machine, as seen in Fig. 1. By means of this lever and the link connection, the two shafts may be rocked together so as to throw the stops into an upright position, as seen in Figs. 1 to 4, or turn them down into a horizontal position, as seen in Fig. 5, this being the same as in my said prior application.

The patterns, M, are suitably mounted on the pattern table in such a position that they will project up through the stripping plate into the flask. The upper portion, $m$, above the cross line, $m'$, seen in Figs. 2 to 5, constitutes the pattern proper, that is, that portion which must lie within the flask in order to form a suitable mold. The portion of the pattern below this line is simply a deep rectangular block, $m^2$, which is seated on the pattern table and constitutes the support. Horizontal pins, N, are located on the sleeves of the pattern table, preferably on the front flanges thereof as seen in Figs. 1 and 2. These pins are intended to form stops for the platen, being arranged so that the swinging posts on which the platen is mounted will strike against them when the platen is brought accurately into a central position directly over the mold, as seen in Figs. 1 and 2.

The parts are adjusted for operation as seen in Fig. 2, the mold support being at its lowest position of rest, the pattern table thrown up into its working adjustment by a suitable movement of the hand lever, $k^2$, to give an upward thrust to the connecting arms, H, and the stops, L, turned into an upright position. Just as the pattern table reaches the plane of adjustment desired, the pins on the lower ends of the connecting arms, H, engage with the notch or recess at the inner end of the slots, $g$, in the cam-plates, and the toe pieces, $g^2$, engage with the catches, as already explained; obviously this temporarily secures the pattern table in its elevated position, and in this adjustment the patterns are intended to be projected above the stripping plate beyond the plane actually required for making the mold; that is, somewhat beyond the finishing plane. This is shown in Fig. 2, in which it will be seen that the line, $m'$, which marks the division between the pattern proper and its base is carried up somewhat above the surface of the stripping plate, which marks the plane in which said line must lie when the mold is finished. A flask is, of course, mounted on the stripping plate and filled with sand and the platen swung over directly above the mold, as seen in Fig. 2. Fluid is then let into the cylinder and the piston with all the parts supported thereon, as described above, begins to move upward. The adjustment of the devices is intended to be such that, when they are in position ready for this operation, the pins on the connecting arms, H, will barely rest at the edge of the recess or bend in the slot, $g$, of the cam plate, as seen in Fig. 2, and the toe piece, $g^2$, just freely engages with the catch.

The construction of the cam plate in two parts, adjustable upon each other, provides for a nice relative adjustment, whereby the relative position of the devices just pointed out may be accurately obtained.

For a moment the first movement of the piston will carry everything together until contact is made with the platen; at this instant pressure is, of course, brought upon the mold and is transmitted to the patterns and thence to the connection between the arms, H, and the cam plates.

It will be noted that the plate, G, is practically rigid on the mold support, the two points by which it is connected to the latter moving therewith during this upward movement. As a matter of fact, the plate may be fastened to the support in a rigid position, so far as the operation about to be described is concerned; the object of pivoting being simply to provide for collapsing when the mold is finished, as will be explained presently. In the first position, as seen in Fig. 2, the pins on the bars, H, have a support underneath them, and, consequently, the bars are carried up with the plates during the first movement in which all the devices are moved upward together. But the rock-shaft, K, is mounted on the stationary base, and as the lower ends of the bars, H, are secured to the crank-arms, $k'$, of this shaft, the upward movement of the said arms will lift the outer ends of the said crank arms and rock the shaft, K. Obviously this movement will give a gradual lateral movement to the pins in the slots of the cam plates, for the arms, $k'$, must, of course, move in arcs. As the mold is brought up to the platen, as seen in Fig. 3, this action at the lower ends of the bars, H, has drawn the pins out of the recess in the slot, and left them in a position to move downward and outward in the main slot, as seen in the said Fig. 3. The pattern table will now be permitted to recede gradually under the influence of the pressure on the patterns as the whole structure is moved upward, as described, for the pins at the lower ends of the arms, H, will move outward in their slots to permit this yielding motion of the pattern table, as seen in Fig. 4. It is obvious, however, that this movement is controlled by the upward movement of the cam with the mold support, which movement carries the inclined slots upward, thus providing for a gradual lateral movement outward of the pins as they follow these inclined slots, and this movement permits a corresponding dropping back of the pattern table. This movement is, therefore, controlled entirely by the combined action of the cam plates and rock shaft, K, with its crank-arms connected to the bars, H, and the yielding or retreating movement of the table can proceed only in conjunction with this combined action of the parts named; the outward movement of the arm pins alone would permit the pins to drop at once through the slots in the plates and allow the table to drop to its limit without stopping; but the said crank arms prevent this and permit the pins to pass down the slots only as the plates are carried along upward; the retreating movement of the pattern table is, therefore, gradual and perfectly regulated by the combined action of the devices named. This slow and gradual retreating movement of the pattern table continues, with the upward movement of the entire support, until finally it comes in contact with the stop arms, L, just at the moment that the patterns are brought down to a point where the line, $m'$, will be in the same plane with the surface of the stripping plate, which is the finishing point for the mold, as seen in Fig. 4.

The guide rods, J, being stationary, while the catches are on the moving bed, it is evident that the spring coils, $j'$, on the rods will be brought up into contact with the stops at the upper end of the latter, when, of course, they will be compressed by further movement, and this compression, when the said finishing point of the mold is reached, is sufficient to swing the latch so as to disengage the toe-piece on the cam-plate, as also seen in Fig. 4.

The piston is lowered by exhausting the fluid from the cylinder, the stops, L, turned down by means of the handle, $l^2$, and the pattern table drops or is pulled down by the lever, $k^2$, the lifting mechanism collapsing to permit this movement, as seen in Fig. 5, and the patterns at the same time are drawn down partly through the pattern plate; the platen is swung to one side, and the flask with the completed mold removed. In preparing for a repetition of this operation, the pattern table is again thrown up into position seen in Fig. 2, by means of the hand lever, $k^2$, and the parts are brought into engagement as already described. Now, in this instance, as in my prior application aforesaid, the amount of independent yielding movement provided for the pattern table must be regulated so as to give the same amount of relative pressure upon the sand above and around the patterns as in the full depth portions thereof outside of the patterns, and there will be thus produced a mold in which the sand is uniformly compacted throughout, this final result being the same as in my aforesaid application.

It will be seen then that I have here described and shown another mechanism for performing substantially the same operation and obtaining the same final result as set forth in the said prior application; and still other varieties of mechanism may be employed for the same general purpose and with the same general operation. I wish, therefore, to be understood as claiming, not only my particular mechanism whereby these results are obtained, but also other similar mechanisms adapted to give a differential movement to the mold support and the pattern support as they are brought under the influence of the pressure required to form the mold.

Having thus described my invention, what I believe to be new, and wish to secure by Letters Patent, is—

1. In a molding machine, a stationary platen, in combination with a movable mold support and stripping plate mounted thereon, a pattern table mounted on said support and adapted to move independently thereof in line with the general movement toward the platen, mechanism connecting the pattern table to the support, whereby they are moved toward the platen together, but the table is adapted to yield under pressure brought upon it to retard its movement relatively to that of the mold-support, and mechanism adapted to force the mold support toward the platen, substantially as described.

2. In a molding machine, a stationary platen, in combination with a movable mold support and stripping plate thereon, a pattern table or support sleeved to the mold support, whereby it is connected thereto and is adapted to be moved independently thereof, mechanism for forcing the mold support toward the platen, and yielding mechanism connecting the pattern table to the mold support, whereby the said two supports are adapted normally to move together but the pattern table is permitted to yield backward somewhat when pressure is brought directly thereon, substantially as described.

3. In a molding machine, a stationary platen, in combination with a movable mold support and stripping plate mounted thereon, an independent pattern table movably mounted on said support, cam plates, G, hinged to the mold support and provided with slots, $g$—$g'$, and connecting bars, H, hinged at one end to the said table and provided with pins, $h$, at their other ends engaging in the slots of the said plates, substantially as described.

4. In a molding machine, a movable mold support, C, upright posts, $F'$, mounted thereon, pattern table, F, provided with sleeves, $f'$, adapted to receive said posts, cam plates, G, hinged to the mold support and provided with slots, $g$—$g'$, and toe pieces, $g^2$, connecting bars, H, hinged at one end to the said table and engaging at their other ends with said plates by pins entering the slots therein, and latches, I, pivoted to the mold support and adapted to engage with the toe pieces, $g^2$, on the cam plates, substantially as described.

5. In a molding machine, a movable mold support and stripping plate thereon, in combination with a pattern table carried on the said support and movable independently thereof, the cam plates, G, hinged to the mold support and provided with slot, $g$, and toe, $g^2$, connecting bars, H, hinged to the pattern table and engaging by a pin with the slot in the plates, G, catches, I, on the mold support adapted to engage the toe piece, $g^2$, and rock shaft, K, provided with arms, $k'$, hinged to the lower ends of the said connecting bars, substantially as described.

6. In a molding machine, a movable mold support, in combination with a pattern table carried thereby and movable independently thereof, the cam plates, G, hinged to the said support and provided with slot, $g$ and toe piece, $g^2$, bars, H, hinged to the said table and engaging at their lower ends with the slots in said plates, right angled catches, I, pivoted to the said support and having a notch in one arm adapted to engage the toe-piece $g^2$ and an elongated slot in the other arm, stationary guide rods, J, passing through the slotted arms of the catches, and springs, $j$, substantially as described.

7. In a molding machine, a movable mold support, in combination with a pattern table mounted and movable thereon, the cam plate, G, consisting of two parts, $g^3$—$g^4$, constructed and secured together as specified and provided with slots, $g$—$g'$, and toe piece, $g^2$, connecting bar, H, uniting the said table and slotted plate, catches, I, on the mold support, and rock-shaft, K, provided with arms, $k'$, connected to the bar, H, at each end of the machine, substantially as described.

8. In a molding machine, the pattern table mounted and movable on a movable mold support, in combination with adjustable stops, L, arranged underneath the said table, slotted cam plates, G, hinged to the mold support, bars, H, connecting the table with the said plates, rock-shaft, K, provided with arms, $k'$, connected to the bars, H, and a lever handle, $k^2$, whereby it may be oscillated, substantially as described.

WILLIAM W. DOOLITTLE.

Witnesses:
R. C. PAGE,
A. L. McDOWELL.